(12) United States Patent
Chen

(10) Patent No.: US 6,275,188 B1
(45) Date of Patent: Aug. 14, 2001

(54) NULLING DIRECT RADIATING ARRAY

(75) Inventor: Chun-Hong H. Chen, Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/505,816

(22) Filed: Feb. 17, 2000

(51) Int. Cl.[7] ..................................................... G01S 3/28
(52) U.S. Cl. ........................... 342/382; 342/14; 342/378
(58) Field of Search .............................. 342/14, 378, 382, 342/383, 380

(56) References Cited

U.S. PATENT DOCUMENTS

| | | | |
|---|---|---|---|
| 3,706,998 | * 12/1972 | Hatcher et al. | 343/754 |
| 4,495,502 | * 1/1985 | Masak | 343/380 |
| 4,516,126 | * 5/1985 | Masak et al. | 343/383 |
| 4,628,321 | * 12/1986 | Martin | 342/379 |
| 4,673,943 | * 6/1987 | Hannan | 342/367 |
| 4,937,584 | * 6/1990 | Gabriel et al. | 342/378 |
| 5,185,608 | * 2/1993 | Pozgay | 342/17 |
| 5,734,345 | 3/1998 | Chen et al. | |
| 5,760,741 | 6/1998 | Huynh et al. | |

OTHER PUBLICATIONS

U.S. patent application Ser. No. 09/443,526, filed Nov. 19, 1999, titled "Enhanced Direct Radiating Array".

* cited by examiner

*Primary Examiner*—Dao Phan
(74) *Attorney, Agent, or Firm*—Robert W. Keller

(57) ABSTRACT

A nulling direct radiating array (30) that includes a main phased array (32) and a plurality of auxiliary arrays (70, 72, 74) symmetrically disposed about the main array (32). The main array (32) includes a plurality of antenna elements (34) and a beam forming system (56) that generates one or more channels made up of several pixel beams. The pixel beams from the main array (32) are connected to a nulling processor (108) along with the combined signal from the antenna elements (80) of the auxiliary arrays (70, 72, 74). An adaptive weighting network (112) and an adaptive weight generator (114) within the nulling processor (108) determine whether a jamming signal exists in the channel beam, and weight the pixel beams from the main array (32) accordingly to block the jamming signal. The auxiliary arrays (70, 72, 74) provide a wider beam aperture that is able to more narrowly define the null in the radiation pattern of the main array (32).

16 Claims, 3 Drawing Sheets

NULLING DIRECT RADIATING ARRAY

BACKGROUND OF THE INVENTION

1. Field of the Invention

This invention relates generally to a nulling antenna system and, more particularly, to a nulling direct radiating array antenna that employs auxiliary antenna arrays positioned around a main array for increasing the nulling resolution.

2. Discussion of the Related Art

Various communications systems, such as certain telephone systems, cable television systems, internet systems, and military communications systems, make use of satellites orbiting the Earth to transfer communication signals. A satellite uplink communications signal is transmitted to the satellite from one or more ground stations, and the satellite retransmits the signal to another satellite or to the Earth as a downlink communications signal to cover a desirable reception area depending on the particular use. The satellite is equipped with an antenna system including an array of antenna feeds that receive the uplink signals and transmit the downlink signals to the Earth.

Satellite-based phased array antenna systems have been developed that provide signals to communication areas using pixel beams designed to cover specific areas on the Earth's surface. Typically, the pixel beams are organized into a matrix of evenly shaped and spaced beams to provide a total coverage area for a large geographical area, such as the visible Earth. One particular phased array suitable for this purpose is the "Enhanced Direct Radiating Array" disclosed in U.S. patent application Ser. No. 09/443,526, filed Nov. 19, 1999, assigned to the assignee of this application and herein incorporated by reference.

FIG. 1 is a hexagonal coverage area 10 including cells 12 defined by a phased array antenna system, where each cell 12 represents a pixel beam. The antenna system may provide a plurality of communications channels where each channel includes a plurality of pixel beams. In this example, each channel includes a hexagonal group 14 of seven cells 12, where each cell 12 in each group 14 is labeled A–G. The particular user may be located in the center cell 12 of the group 14, where the perimeter cells 12 in the group 14 provide for increased communications performance. Communications signals from locations in the group 14 are received by the antenna system on the satellite, and then retransmitted to another group 14 for communications purposes. The phased array antenna system provides beam steering for all of the groups 14.

Intentional and unintentional jamming of satellite uplink signals occurs in various situations. For example, in a military situation, satellite communications are used to transmit signals and information to and from a warfare theatre or hostile environment. The reception area for the uplink communications signals in the hostile environment may be jammed by the enemy using a high powered transmitter. If the jamming signal comes from with-in the channel area for the uplink signal, it is referred to as in-beam jamming, and if it comes from outside of the channel area for the uplink signal, it is referred to as out-of-beam jamming. The jamming signal must be at the frequency of the uplink signal to be effective for jamming purposes. Jamming signals can also come from unintentional or friendly sources that inadvertently interfere with the satellite uplink signals.

In order to eliminate or reduce the effects of jamming signals in both hostile and friendly scenarios, it is known to employ nulling antenna systems that detect the presence of a jamming signal, and provide an antenna null in the antenna radiation or reception pattern so that the jamming signal does not significantly affect the uplink signal. Particularly, nulling antenna systems are able to determine the direction of the jamming signal and create a null or void in the radiation pattern of the antenna so that it in effect does not see the jamming signal. In order to be able to block or null the jamming signal so that it does not affect the ability to transmit the downlink signal, it is necessary to determine the location of the signal, whether it be from an in-beam or out-of-beam jamming source, and then provide the null at that location.

An adaptive weighting system is generally used in nulling antenna systems to sample the received pixel beams in a particular channel to determine if a jamming signal is present. The weighting system then weights the pixel beams in the channel to block the jamming signal. The weighting system generally includes a correlator to correlate each of the pixel beams with the combined beam for the channel to determine if a jamming signal is present. Once the correlator determines that a jamming signal is present, algorithms are used to determine the location of the jamming signal. The algorithm goes through each pixel beam separately using a weighting function to determine where the jamming signal is being received from. The weighting function provides the null by inverting the phase of the received signal at the appropriate location. When the weighting of the pixel beams blocks the jamming signal and the image is cleared up, the antenna system knows where the jamming signal is being received from, and can make weighting adjustments accordingly. Various algorithms that perform this function are known to those skilled in the art.

The nulled area of the radiation pattern of the antenna has a width and a depth which determines its effectiveness in nulling the jamming signal. However, creating a null in the radiation pattern of the antenna also creates a "blind spot" in the uplink signal. Therefore, it is desirable to limit the size of the null while still blocking the jamming signal. In other words, it would be desirable to provide higher nulling resolution to tightly define the null in the radiation pattern so that more of the uplink signal can be processed by the antenna system. This would minimize the area of the radiation pattern that is nulled, and still provide effective anti-jamming. In this manner, it is possible to provide communication to a wider area around the jamming source.

It is known by antenna theory to narrow the antenna radiation pattern by increasing the aperture size of the antenna, i.e., providing more antenna elements. However, adding more antenna elements to increase the aperture size significantly increases the cost and complexity of the antenna system. It would be desirable to increase the aperture of the nulling antenna, without significantly increasing the number of elements to provide more effective nulling capabilities. It is therefore an objection of the present invention to provide such a nulling antenna.

SUMMARY OF THE INVENTION

In accordance with the teachings of the present invention, a nulling direct radiating array is disclosed that includes a main phased array and a plurality of auxiliary arrays symmetrically disposed around and spaced apart from the main array. The main array includes a plurality of antenna elements and a beam forming system that generates one or more channels made up of pixel beams. The pixel beams from the main array are connected to a nulling processor along with the combined signal from the antenna elements of the auxiliary arrays. An adaptive weighting network and an adaptive weight generator within the nulling processor determine whether a jamming signal exists in the channel, and weights the pixel beams from the main array accordingly to block the jamming signal. The auxiliary arrays provide a wider beam aperture that is able to more narrowly define the null in the radiation pattern of the main array.

Additional objects, features and advantages of the present invention will become apparent from the following description and appended claims, taken in conjunction with the accompanying drawings.

DETAILED DESCRIPTION OF THE PREFERRED EMBODIMENTS

The following discussion of the preferred embodiments directed to a nulling direct radiating array is merely exemplary in nature, and is in no way intended to limit the invention or its applications or uses. For example, the discussion below of the nulling direct radiating array is for satellite communication purposes, but as will be appreciated by those skilled in the art, can be used for anti-jamming purposes in other types of communication systems.

Figure 1:
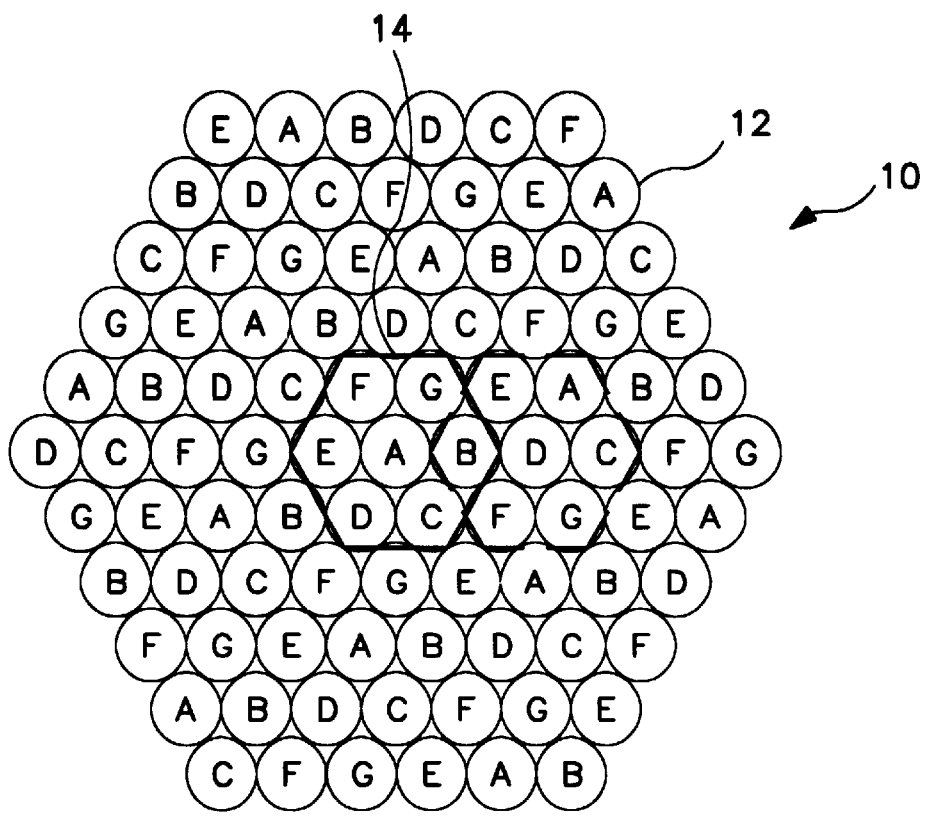
FIG. 1 is a plurality of satellite pixel beam cells arranged in a particular field-of-view pattern.
Figure 2:
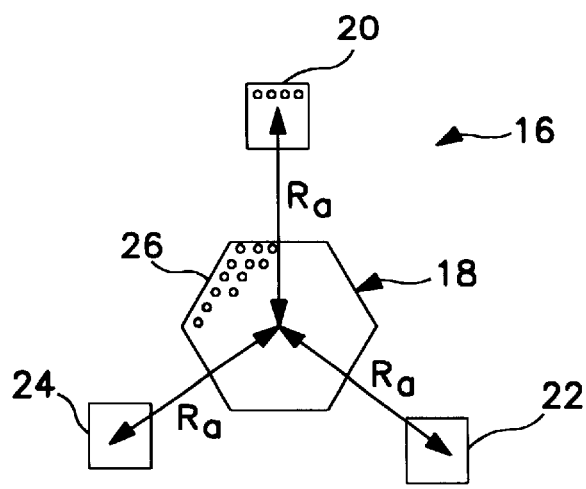
FIG. 2 is a plan view of an antenna system including an EDRA and a plurality of auxiliary arrays, according to an embodiment of the present invention.

FIG. 2 is a plan view of a nulling antenna system 16 including an EDRA 18 and auxiliary antenna arrays 20–24 symmetrically positioned around the EDRA 18. Each of the arrays 18–24 includes a plurality of antenna elements 26, some of which are shown here. The EDRA 18 is used for receiving and transmitting communications signals to and from the Earth, and the combination of the EDRA 18 and the auxiliary antenna arrays 20–24 is used as a nulling array for anti-jamming purposes. In this example, the EDRA 18 is hexagonal in shape and the arrays 20–24 are square in shape. However, for different applications, the EDRA 18 and the arrays 20–24 can have other shapes. The arrays 20–24 are provided a certain radius $R_a$ away from the center of the EDRA 18. In one example, $R_a$ is about the diameter of the EDRA 18, but can be other values depending on the particular application. Additionally, the arrays 20–24 are positioned symmetrically around the EDRA 18 for performance purposes. More or less auxiliary arrays 20–24 can be provided, but at system expense or performance.

The wider the aperture of an antenna, the narrower its radiation and reception pattern. In order to provide a nulling radiation pattern that only nulls the specific location in a communications radiation pattern where a jamming signal is located and doesn't significantly interfere with the communications signal at other locations, it is necessary that the nulling radiation pattern be narrow. To accomplish this, it is desirable to increase the aperture width of the nulling antenna arrays. A channel group 14 is identified around a particular communications user on the Earth by the EDRA 18. The radiation pattern of the nulling array is directed towards the jamming signal identified within that group 14 if it is in-beam jamming, and out of the group 14 if it is out-of-beam jamming. The nulling radiation pattern is subtracted from the communications radiation pattern by inverting its phase so that the jamming signal is nulled from the communications signal.

Figure 3:
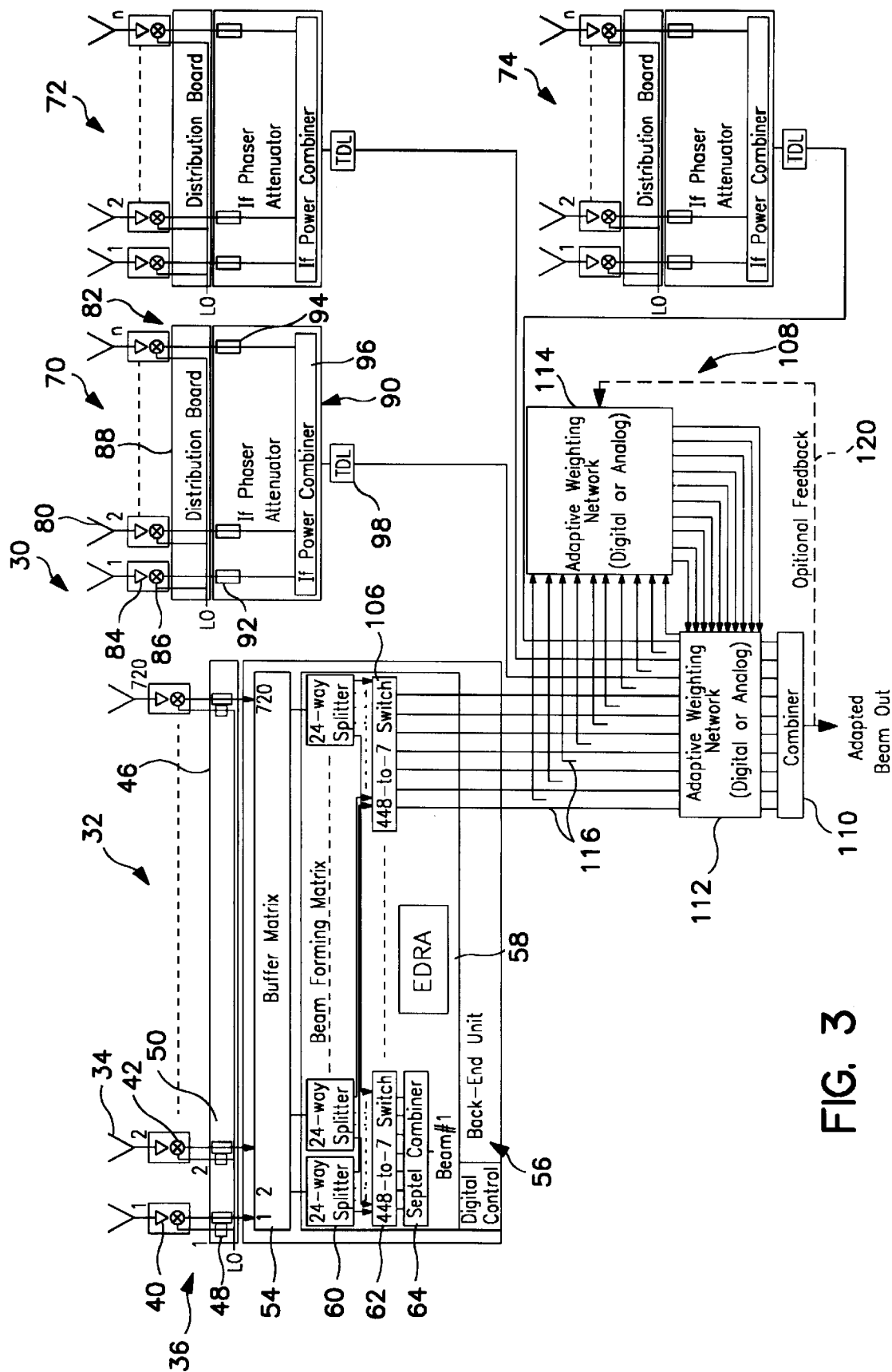
FIG. 3 is a schematic block diagram of a nulling direct radiating array, according to an embodiment of the present invention.

FIG. 3 is a schematic block diagram of a nulling antenna array system 30, according to an embodiment of the present invention. The system 30 includes an EDRA 32 of the type discussed above. In this example, the EDRA has 720 antenna elements 34, and provides a full Earth field-of-view. The EDRA 32 receives uplink communications signals from the Earth, and provides phase weighting and beam steering of the received signals to combine a certain number of the signals into pixel beams directed in a certain direction. In this example, seven pixel beams combine to form one communications channel. Each channel defines a group 14 on the Earth.

Each antenna element 34 is connected to a receiver front end 36. The front end 36 includes a low noise amplifier (LNA) 40 that amplifies the received signal. The amplified signal is applied to a mixer 42 for frequency down-conversion purposes to an intermediate frequency (IF). A local oscillator (LO) signal is applied to a distribution board 46 that distributes the LO signal to each of the mixers 42 to be mixed with the amplified signal. In order to maintain coherence between all of the mixers 42, the distribution board 46 further includes phase shifters 48 that align the LO signals in phase prior to the LO signals being applied to the mixers 42. The down-converted IF signals from the mixers 42 are applied to an attenuator 50 within the distribution board 46. The attenuators 50 provide amplitude tapering to control beam side lobes, as is well understood in the art.

The down-converted signals from the antenna elements 34 are then applied to a back end unit 56. The back end unit 56 performs beam steering functions in three steps. A Butler matrix 54 receives the down-converted antenna element signals and converts them to a plurality of pixel beams. In other words, the Butler matrix 54 converts the received signals from an element space to a beam space to allow the EDRA 32 to receive signals anywhere on the Earth. In this example, the Butler matrix 54 transforms the 720 antenna element signals into 448 pixel beams. The Butler matrix 54 also provides phase combining of the antenna element signals.

Each of the pixel beams from the Butler matrix 54 is then applied to a separate 24–way splitter 60 in a beam forming matrix 58. Each of the 24-way splitters 60 splits its pixel beam twenty-four times and sends a separate one of the beams to a 448-to-7 switch 62. Each switch 62 receives one pixel beam from each splitter 60 to combine the pixel beams into 24 seven beam channels. The seven pixel beam outputs from each switch 62 are applied to a combiner 64 that combines the signals into a single beam channel. A more detailed discussion of the operation of the EDRA can be found in the '526 application referred to above.

According to the present invention, the nulling antenna array system 30 includes three conventional phased arrays (CPAs) 70, 72 and 74, representing the auxiliary arrays 20–24 above. Only the CPA 70 will be discussed herein, with the understanding that the other arrays 72 and 74 operate in the same manner. The CPA 70 includes a plurality of antenna elements 80. In one embodiment, there are one-tenth the number of antenna elements in the CPAs 70–74 as there are in the EDRA 32. However, this is by way of a non-limiting example in that the number of antenna elements in the CPAs 70–74, as well as the actual number of CPAs, may be different for different applications. A front end 82 of the array 70 includes an LNA 84 and a mixer 86 that operate in the same manner as discussed above. An LO signal is applied to a distribution board 88 that distributes the LO signal to the mixers 86 to convert the high frequency signals received by the elements 80 into intermediate frequency signals.

Beam steering is provided in a receiver back-end 90 by IF phasers 92. The IF phasers 92 provide the relative phase differences between the various antenna elements 82 so that the signals received from anywhere on the Earth are in phase relationship to each other. Attenuators 94 provide tapering for side lobe control, and IF power combiners 96 combine all of the received signals into a single combined signal. Because the CPAs 70–74 are relatively far apart, additional phase delaying may be necessary. Therefore, a time delay line (TDL) 98 is provided to delay the combined signal from the combiners 96 so that the signals from the CPAs 70–74 are aligned in phase. In other words, the TDL 98 provides phase alignment for signals that are greater than 360° apart.

In this example, only one of the 24 channels from the EDRA 32 is capable of providing nulling. Particularly, the seven pixel beams from the switch 106 and the combined beams from the CPAs 70–74 are hardwired to a nulling processor 108. The processor 108 includes an adaptive weighting network 112 and an adaptive weight generator 114. The pixel beams from the switch 106 and the combined signals from each of the combiners 96 in the CPAs 70–74 are applied as ten inputs to the adaptive weighting network 112. Ten signal couplers 116 are provided to couple a portion of the signals off of each line applied to the adaptive weighting network 112 and apply the coupled signal to the adaptive weight generator 114. The seven pixel beams from the switch 106 that make up the communications channel are separated and combined in the adaptive weighting network 112. A combiner 110 for the nulling array combines the seven pixel beams from the switch 106 and the auxiliary beams from the arrays 70–74.

The adaptive weight generator 114 goes through a known mathematical algorithm to determine if a jamming signal does exist, and if so where it is located. The adaptive weight generator 114 provides a weighting for each input line based on this determination that is applied to the adaptive weighting network 112. For example, if the adaptive weight network determines that a jamming signal is on one of the pixel beams from the switch 106, it will weight that line to zero so that it does not influence the overall signal. Any combination of pixel beams can be weighted in this manner. The adaptive weighting network 12 provides the adaptive weighting by inverting the phase of the nulling signal and combining it with the communications signal on the channel from the switch 106 so that the jamming signal is nulled.

The adaptive weighting network 112 receives the weighting from the adaptive weight generator 114 and applies the weighting on the received signals from the switch 106 and the CPAs 70–74. An optional feedback path 120 can be applied from the combined output of the combiner 110 to the adaptive weight generator 114 so the adaptive weight generator 114 establishes that the jamming signal has in fact been nulled. The signal outputs from the adaptive weighting network 112 are applied to the combiner 110 that provides the weighted beam output. The adaptive weighting network 112 and the adaptive weight generator 114 can be digital or analog depending on the particular embodiment. The discussion above of the nulling processor 108 is by way of example. The present invention can use any suitable nulling processing known in the art.

Figure 4:
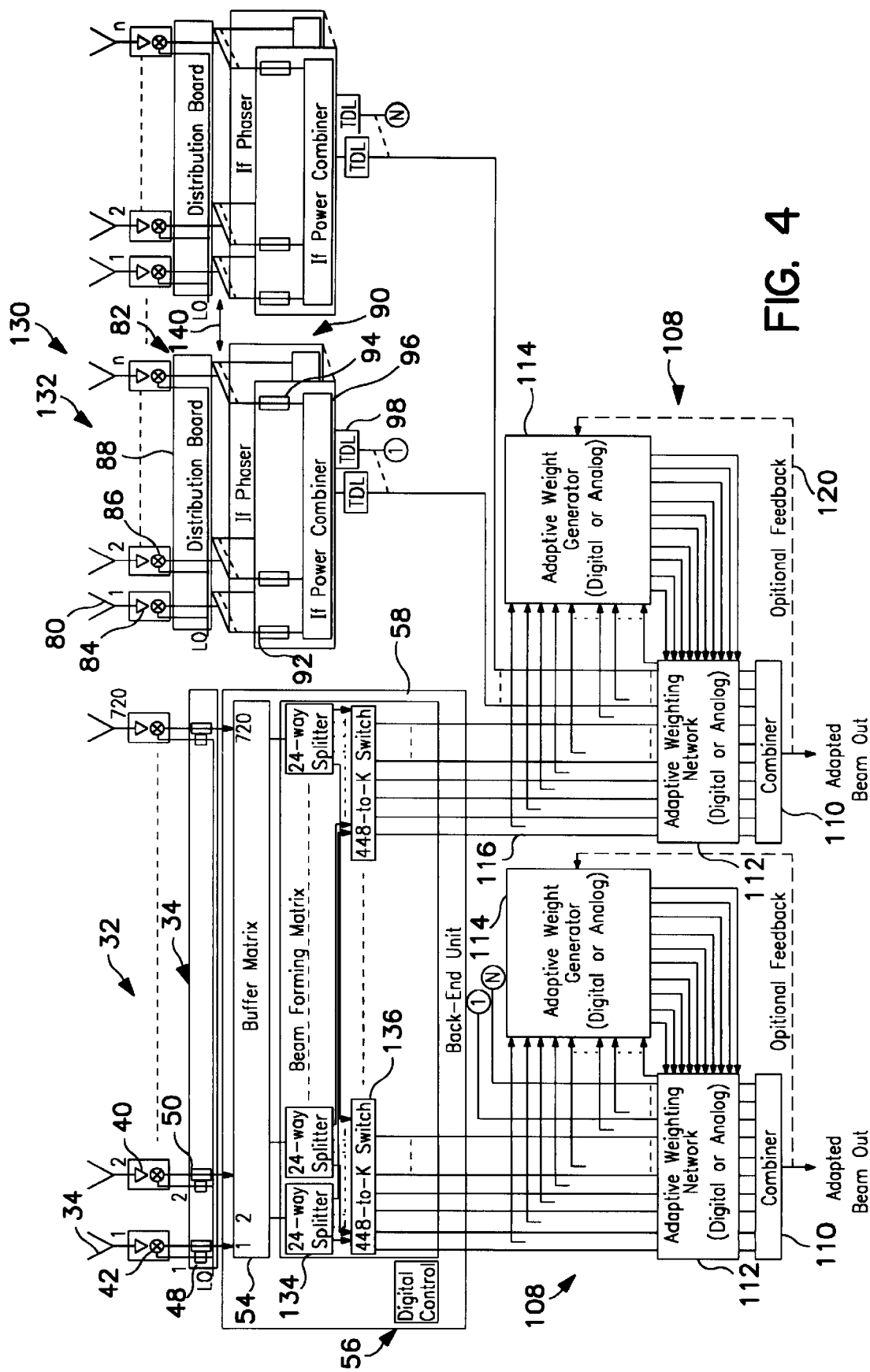
FIG. 4 is a schematic block diagram of a nulling direct radiating antenna, according to another embodiment of the present invention.

The discussion above with reference to the nulling antenna array system 30 only nulls one of the 24 channels from the EDRA 32. In an alternate embodiment, any number of the available channels can have nulling capabilities. To show this embodiment, FIG. 4 depicts a general nulling antenna array system 130 that provides nulling capabilities for each of the channels from the EDRA 32. In the system 130, like components to the system 30 are identified with the same reference numeral. In this embodiment, there are M number of channels, where K number of pixel beams make up a channel. The number of channels is general, so that the 24-way splitters 60 are replaced with M-way splitters 134. Likewise, because each M channel includes K number of pixel beams, the switches 62 have been replaced with 448-to-K switches 136. Further, the number of auxiliary arrays is general so there are N number of auxiliary arrays 132.

Each of the switches 136 is attached to a nulling processor 108 in the same manner as the switch 106 above. Further, each array 132 includes M number of back-ends 90, one for each M channel, where the signals from the distribution board 82 are split by an M-way splitter 140. A combined output from the array 132 is provided to each nulling processor 108, where each combined output is applied to a TDL 98. Therefore, each M channel from the back-end unit 56 can be nulled separately.

The foregoing discussion discloses and describes merely embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A nulling antenna system comprising:
   a main phased array including a plurality of antenna elements, said main phased array combining signals received by the antenna elements into a plurality of pixel beams, said plurality of pixel beams defining at least one communications channel;
   a plurality of auxiliary phased arrays positioned around and spaced from the main array, each of the auxiliary phased arrays including a plurality of antenna elements, each of the auxiliary arrays combining signals received by the auxiliary antenna elements into an auxiliary beam; and
   at least one adaptive weighting system responsive to a plurality of pixel beams defining the at least one communications channel and the plurality of auxiliary beams from the auxiliary arrays, said adaptive weighting system determining if a jamming signal is being received by the main array and weighting the pixel beams so that the jamming signal is nulled from the at least one channel.

2. The system according to claim 1 wherein the plurality of auxiliary arrays includes three auxiliary arrays symmetrically positioned around the main array.

3. The system according to claim 1 wherein the distance between the center of the main array and the center of the auxiliary arrays is about the diameter of the combination of elements in the main array.

4. The system according to claim 1 wherein the elements in the main array are arranged in a hexagonal configuration.

5. The system according to claim 1 wherein the number of elements in the auxiliary arrays is about one-tenth the number of elements in the main array.

6. The system according to claim 1 wherein the at least one adaptive weighting system includes an adaptive weighting network and an adaptive weight generator, said adaptive weight generator sampling a portion of the pixel beams and the auxiliary beams, and determining the existence and location of the jamming signal, said weight generator providing signals to the weighting network to weight the pixel beams to null the jamming signal.

7. The system according to claim 1 wherein the at least one adaptive weighting system includes an adaptive weighting system for each of a plurality of communications channels.

8. The system according to claim 7 wherein each auxiliary array includes a splitter for separating the auxiliary beams into separate auxiliary beams for each adaptive weighting system.

9. The system according to claim 1 wherein the main array is an enhanced direct radiating array and the auxiliary arrays are conventional phased arrays.

10. The system according to claim 1 wherein the at least one communications channel is a plurality of communications channel where each channel includes seven pixel beams.

11. The system according to claim 1 wherein each auxiliary array includes a time delay device to align the auxiliary beams with each other in time.

12. The system according to claim 1 wherein the antenna system is positioned on a satellite.

13. A method of nulling a jamming signal received by a communications antenna array, said method comprising the steps of:
  positioning a plurality of auxiliary antenna arrays around the communications array and spaced therefrom to provide a nulling array;
  sampling a plurality of pixel beams from the communications array and a plurality of auxiliary beams from the auxiliary arrays to determine if the jamming signal is being received by the communications array; and
  weighting the pixel beams to null the jamming signal if the jamming signal is being received.

14. The method according to claim 13 wherein the step of positioning a plurality of auxiliary antenna arrays includes positioning three auxiliary antenna arrays symmetrically disposed around the communications array.

15. The method according to claim 13 wherein the communications antenna array is an enhanced direct radiating array, and the step of positioning a plurality of auxiliary antenna arrays includes positioning a plurality of conventional phased antenna arrays.

16. The method according to claim 13 wherein the step of weighting the pixel beams to null the jamming signal includes employing an adaptive weighting network and an adaptive weight generator to detect the jamming signal and weight the pixel beams.

* * * * *